United States Patent [19]

Hassler

[11] 4,395,912
[45] Aug. 2, 1983

[54] APPARATUS FOR ULTRASONIC SCANNING

[75] Inventor: Dieter Hassler, Uttenreuth, Fed. Rep. of Germany

[73] Assignee: Siemens Aktiengesellschaft, Berlin & Munich, Fed. Rep. of Germany

[21] Appl. No.: 204,239

[22] Filed: Nov. 5, 1980

[30] Foreign Application Priority Data

Dec. 12, 1979 [DE] Fed. Rep. of Germany ....... 2950005

[51] Int. Cl.³ .................... G01N 29/00; G01N 9/24
[52] U.S. Cl. ...................................... 73/626; 128/660
[58] Field of Search ................ 73/626; 367/105, 125; 128/660

[56] References Cited

U.S. PATENT DOCUMENTS

| 3,367,173 | 2/1968 | Uphoff | 73/631 |
|---|---|---|---|
| 3,778,757 | 12/1973 | Houston | 73/626 |
| 3,815,409 | 6/1974 | Macovski | 73/615 |
| 3,974,682 | 8/1976 | Soldner et al. | 128/660 X |
| 4,012,952 | 3/1977 | Dory | 73/626 |
| 4,019,169 | 4/1977 | Takamizawa | 340/1 R |
| 4,063,549 | 12/1977 | Beretsky et al. | 73/626 X |
| 4,098,130 | 7/1978 | Coffey et al. | 73/614 X |
| 4,131,023 | 12/1978 | Mezrich et al. | 73/626 |
| 4,161,121 | 7/1979 | Zitelli et al. | 73/626 |
| 4,173,007 | 10/1979 | McKeighen | 367/11 |
| 4,235,111 | 11/1980 | Hassler | 73/626 |
| 4,241,610 | 12/1980 | Anderson | 73/626 |
| 4,242,912 | 1/1981 | Burckhardt et al. | 73/626 |
| 4,257,271 | 3/1981 | Glenn | 73/626 |
| 4,277,978 | 7/1981 | Puckette | 73/632 |

FOREIGN PATENT DOCUMENTS 2043899 10/1980 United Kingdom .......... 73/290 UX

Primary Examiner—Stephen A. Kreitman
Assistant Examiner—David V. Carlson
Attorney, Agent, or Firm—Hill, Van Santen, Steadman, Chiara & Simpson

[57] ABSTRACT

In an exemplary embodiment, an ultrasonic array has an installation for dynamic focusing at least in the transmitting mode. It is the object of the disclosure to avoid excessively great time loss, and yet to permit dynamic focusing also in the transmitting mode. This object is achieved in that, in the case of a specifiable number of depth regions (with a respective fixed focusing in each depth region) preferably associated with each scanning line of the ultrasonic scanning, the transmitting/receiving cycle for each fixed focusing is progressively introduced in such a manner that, for every depth region of each such scanning line, transmission is effected at such a time-point which immediately follows, for example, that time interval in which echo information was received from the chronologically prior-scanned depth region for such scanning line. More generally, the second ultrasonic pulse for a given scanning line occurs while echo signals due to the first pulse are still returning from the depth extent of the body which is under examination.

9 Claims, 4 Drawing Figures

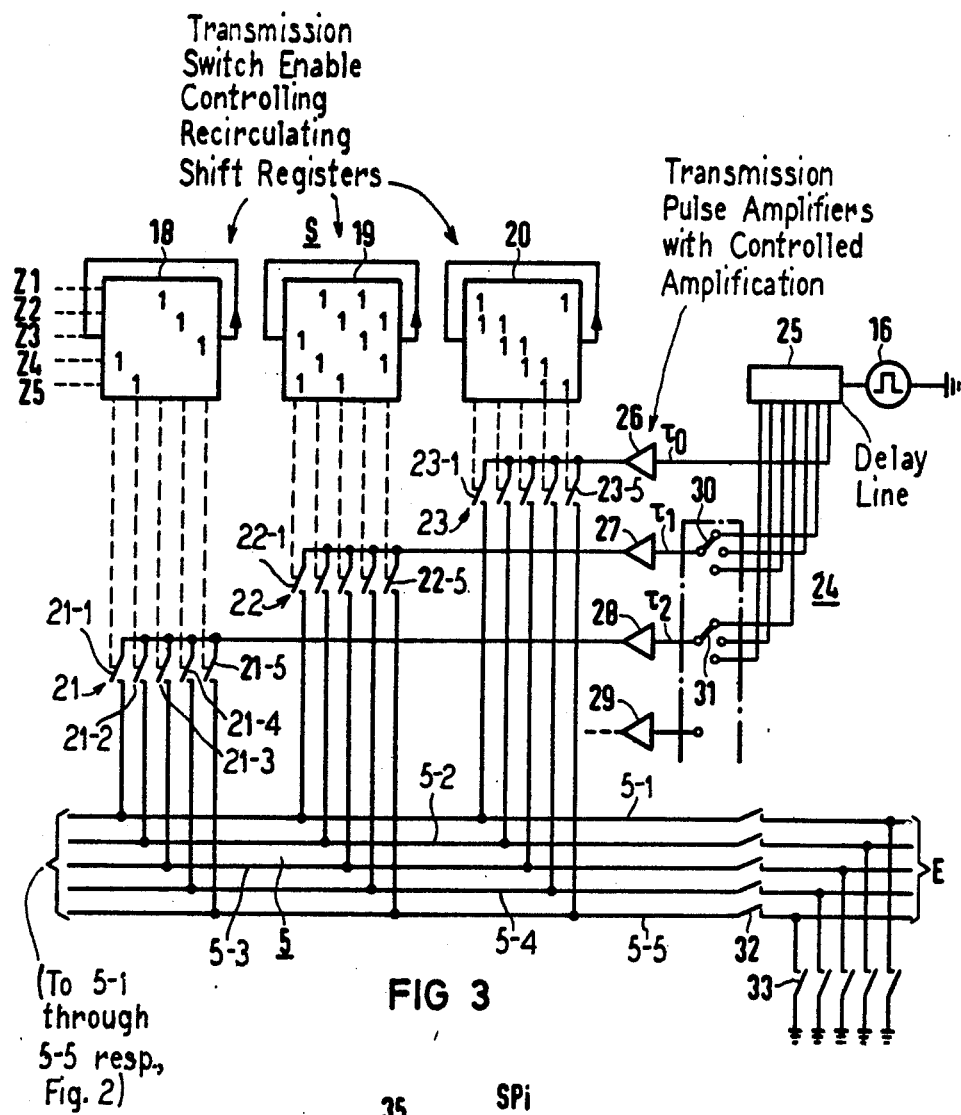
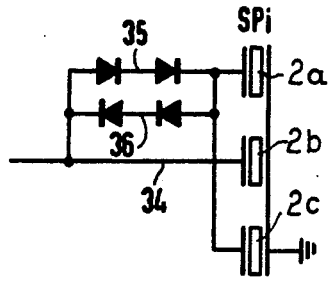
FIG 3
FIG 4

APPARATUS FOR ULTRASONIC SCANNING

BACKGROUND OF THE INVENTION

The invention relates to an apparatus for ultrasonic scanning comprising an ultrasonic scanning head, in particular, an ultrasonic array, and a recording device for an echo visual image, as well as an installation for dynamic focusing at least in the transmitting mode.

An apparatus for ultrasonic scanning, which functions with dynamic focusing in the receiving mode, is e.g. described in Hassler U.S. Pat. No. 4,235,111 issued Nov. 25, 1980. Also already listed therein as state of the art is an apparatus of the type initially cited; i.e., such an apparatus which functions with dynamic focusing at least in the transmitting mode. The dynamic focusing in the transmitting mode increases the directivity of the antenna, as a consequence of which the transverse resolution of the image system is improved. However, this advantage is offset by the disadvantage that a concomitance of the transmitting focusing entails losses of time and scanning frequency; the time outlay for the image construction (or build-up) increases unnecessarily.

SUMMARY OF THE INVENTION

It is a principal object of the invention to provide an ultrasonic apparatus of the type initially cited which nevertheless, with avoidance of excessively great time loss, permits dynamic focusing also in the transmitting mode.

The object is achieved in accordance with the invention in that, in the case of a specified number of depth regions (or zones) for fixed focusing, which is preferably associated with each scan line of the ultrasonic scanning, the transmitting/receiving cycle for each fixed focusing is controllable in such a fashion that, for every depth region of the respective line to be scanned, transmission is carried out at such a time which immediately follows (or which follows delayed by a specifiable time which is smaller than double the transit time of the full scan depth), that particular interval in which complete echo information was received from the chronologically prior-scanned depth region.

The invention proceeds from the consideration that, for the purpose of adequate suppression of image flickering, the image repetition frequency on the image display unit is to be as great as possible (e.g. equal to or greater than 50 Hz); however, generally, for resolution of body-internal movement processes a low ultrasonic scanning frequency (e.g. 25 to 30 Hz) suffices. This low ultrasonic scanning frequency can be comfortably attained with the invention, so that dynamic focusing is thus also guaranteed in the transmitting mode without great time loss. Further, the relatively low ultrasonic scanning frequency can then be comfortably converted, in a conventional technical realization, into the higher image frequency by means of a memory or the like (e.g. alternating buffer memory).

In an advantageous embodiment of the invention, the successive focusing modes of each transmitting/receiving cycle can be effected successively at different depth regions for one and the same scan line, or also such successive focusing modes can be introduced e.g. in the interlaced scanning procedure for different lines. The transmitting/receiving cycle can also be progressively controllable, simultaneously for several e.g. two scan lines which are spaced part in an adequate spatial interval. The transmission focusing, in an advantageous embodiment, can also be coupled with a receiving focusing. In all instances, the transmission focusing can proceed selectively via transmitting delays and/or through variation in the size of the transmitting surface. In the case of application of a focusing through variation of the transmitting surface the latter is to be correspondingly capable of enlargement with increasing depth.

Further advantages and details of the invention shall be apparent from the following description of an exemplary embodiment on the basis of the accompanying drawing sheets in conjunction with the subclaims; and other objects, features and advantages will be apparent from this detailed disclosure and from the appended claims.

BRIEF DESCRIPTION OF THE DRAWINGS

FIG. 3 illustrates a basic circuit diagram for transmission focusing which is applicable to the basic circuit diagram of FIG. 2; and FIG. 4 illustrates an exemplary implementation for transmitting and receiving switches.

DETAILED DESCRIPTION

Figure 1:
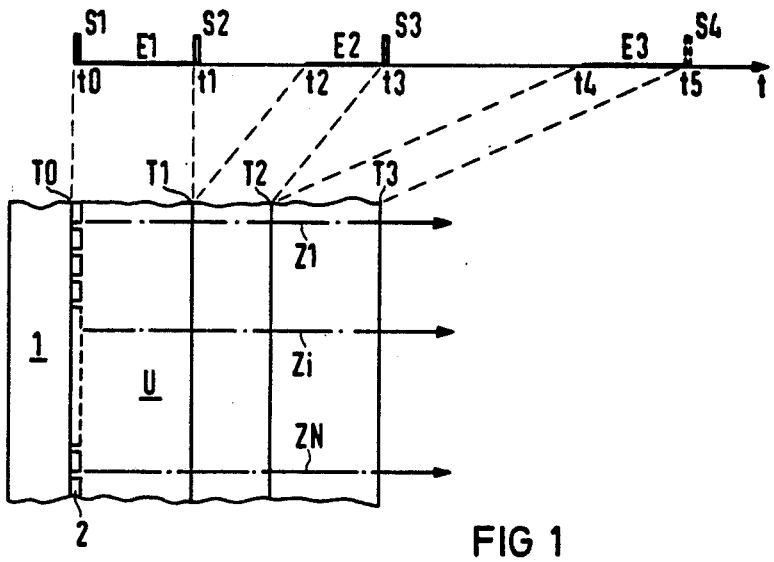
FIG. 1 illustrates a diagram for explaining a sequence of transmission focusing in accordance with the present invention.

FIG. 1 shows in schematic illustration the ultrasonic scanning plane U of an ultrasonic array 1 comprising a transducer row 2, for obtaining a sectional image of a subject; for example, from the interior of the human body. The scanning proceeds in lines Z1 through ZN by means of chronologically successive excitation of individual transducer elements or groups of transducer elements.

The scanning plane U is subdivided into three depth regions T0 to T1, T1 to T2 to T3. The three depth regions are regions of varyingly preselected transmission focusing (and preferably simultaneously also receiving focusing). With reference to this illustration, for a 2 MHz-system, a subdivision into the regions T0 to T1=0 to 7 cm, T1 to T2=7 to 12 cm and T2 to T3=12 to 18 cm can be selected. Relative to e.g. biological tissue, for forward travel and return travel of ultrasonic signals in the individual depth regions along a line, transit lines of 94 $\mu$s, 160 $\mu$s and 240 $\mu$s then result; thus, in sum, 494 $\mu$s=0.5 ms overall transit time.

In the case of resolution into e.g. eighty lines, with conventional systems without transmission focusing (depth 18 cm=240 $\mu$s for forward travel and return travel), for an image scan cycle a total of 19.2 milliseconds is required, so that the scanning frequency lies at approximately 52 Hz. If, by contrast, focusing were carried out, in the conventional system, already with focusing in two depth regions, the total time of the image construction (or build-up) would have to be doubled to 38.4 milliseconds. The scanning frequency would lie at approximately 26 Hz. In the case of focusing in three regions, the scanning frequency would be lowered to approximately 17 Hz. The invention avoids this disadvantage. According to FIG. 1, namely, a control of the transmitting/receiving cycle proceeds in such a manner that, for example, the second transmitting pulse S2, following the first transmitting pulse S1, is radiated at a time t1 which immediately follows the time interval of reception of echo signals E1 of the first transmitting pulse. Correspondingly, the third transmitting pulse S3 is set at the end of the receiving time of the echo signals E2 of the preceding second transmitting pulse S2, and finally, with a transmitting pulse S4 at the end of the third receiving interval E3, the cycle is commenced again. The consequence of this control is that, in the period of the entire transit through an individual line, there are carried out a total of three transmitting-/receiving cycles with progressively offset or graduated transmitting times $t_0$, $t_1$, $t_3$, $t_5$, etc. occurring at the end of each respective preceding receiving interval $t_0$ through $t_1$, $t_2$ through $t_3$, $t_4$ through $t_5$, etc., which, during the period of an individual line traversal, namely, during a total of only half a millisecond, accordingly renders possible a transmitting focusing in three depth regions disposed behind one another. In spite of transmission focusing, accordingly, for the construction (or build-up) of an individual line, only a total time of approximately 0.5 ms is required. This signifies, in the case of the selected eighty scanning lines, a total time of image construction of forty milliseconds, which then finally leads to a scanning frequency of 25 Hz. As initially stated, such a scanning frequency is largely sufficient for the resolution of body-internal movement processes (with the exception perhaps of the representation of the beating heart, in which higher frequency is required, for which purposes e.g. focusing is then carried out only in two, instead of three, depths).

In carrying out a transmission focusing according to the diagrammatic view of FIG. 1, in a preferred embodiment, with an increasing depth T of the fixed focusing, the intensity of the ultrasonic transmitting signals S1, S2, etc., is to be controllable to higher values. A correspondingly graduated intensity value should here be assigned to every depth T. A display of overlapping echoes, which are triggered by different transmitting pulses in different depths, is thus avoided.

For the purpose of compensation of fluctuations of the signal-to-noise ratio due to e.g. lesser absorption attenuations in the anterior transmission path, in particular during traversal through internal organs which are greatly filled with liquid, a compensation time interval is to be inserted between the end of a preceding receiving time and radiation of the following transmitting pulse. For this reason, a mechanism (e.g. programming unit) is thus to be provided which, in adaptation to the correspondingly applied instance, delays the emission of a transmitting pulse by a corresponding small time interval.

Figure 2:
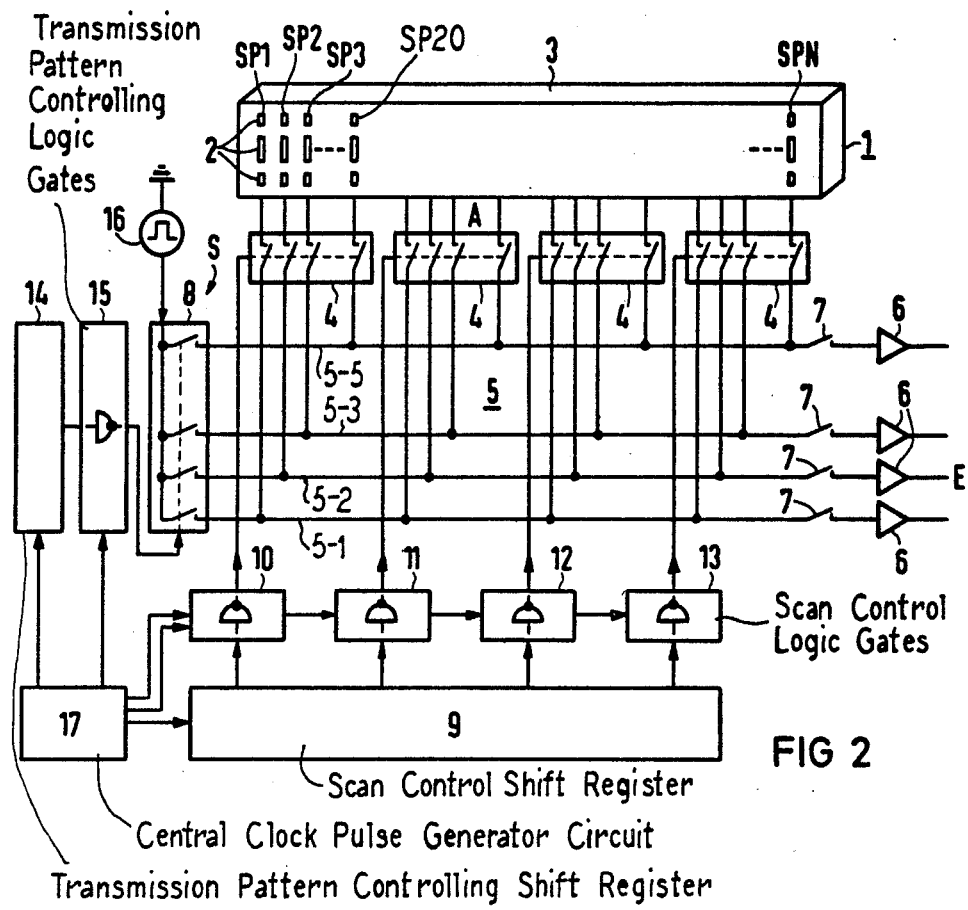
FIG. 2 illustrates the basic circuit diagram of a known apparatus with receiving focusing.

A basic circuit diagram for receiving focusing, such as is shown in FIG. 2, is known from Hassler U.S. Pat. No. 4,235,111 issued Nov. 25, 1980. This basic circuit diagram is also applicable to transmitting focusing in the modification corresponding to FIG. 3.

The basic circuit diagram of FIG. 2 illustrates an ultrasonic array 1 with, for example, a total of 3×80 transducer element plates 2 which, in superposition of always three transducer elements, respectively, are adjacently arranged in a total of eighty columns SP1 through SPN on the support member 3 of the array. At the input side surface pattern switches 4 are associated with the array, which select different plates in different columns for varying receiving surfaces for focusing in the receiving mode. At the receiving side E, via receiving switches 7 and buffer amplifiers 6, the further processing components up to and including the image tube for the construction of the echo visual image, not illustrated in the present instance, follow the surface pattern switches 4. The circuit on the transmitting side S comprises correspondingly the transmitting switches 8, which, in combination with the surface pattern switches 4, can also determine varying transmitting surfaces. The determination of the transmitting surfaces, as well as the forward clock pulsing (or advancing) for the purpose of linear ultrasonic scanning prior to emission of an actual transmission signal from the transmitting side S, proceeds in dependence upon the output signals of the shift register 9 and via logic elements 10, 11, 12 and 13. The control of the transmitting switch 8 proceeds via second shift register 14 with an output logic 15. The high frequency pulses, required for radiation of the ultrasonic transmitting pulses, are delivered by a high frequency transmitting pulse generator 16. A central clock pulse generator 17 serves the purpose of control of the entire functional sequence of a transmission/receiving cycle.

In the case of pure receiving focusing, the shift register 14, the output logic 15 and the transmitting switches 8 are so controlled that, during the complete transmission cycle for a single ultrasonic line, merely a single transmitting pulse is radiated. FIG. 3 modifies the circuit diagram of FIG. 2 to such an extent that, on the transmitting side S for transmitting focusing, specifically in three depth regions, a total of three transmitting shift registers 18, 19 and 20, are provided, and there are correspondingly associated with each shift register three sets of transmitting switches 21, 22 and 23. This transmission type activation of the ultrasonic array via the conductor bar type matrix 5 proceeds via a delay network 24 for the high frequency pulses delivered by the transmitting pulse generator 16, which delay network 24 is series connected with the transmitting switches 21, 22 and 23. The delay network 24, in the case of FIG. 3, consists of a delay line 25 with outputs for varying delay times $\tau_0$, $\tau_1$, $\tau_2$, etc. The time-delayed transmitting signals are finally delivered to the transmitting switches 21, 22 and 23, respectively, via transmitting output stages 26, 27, 28 (possibly for additional transmitting focusing also via 29, etc.). The selection of varying delay times for $\tau_1$, $\tau_2$, etc., is possible by means of selector switches 30, 31. The switches 32, 33 are again the receiving switches.

With the basic circuit diagram of FIG. 3 it is possible to continuously obtain, with the use of transducer columns and scanning lines as shown in FIG. 2 and in FIG. 1, transmitting focusing with e.g. constant aperture of five columns of the array according to the following delay plan:

| Column No. | SP | 1 | 2 | 3 | 4 | 5 | 6 | 7 | 8 | 9 | ... |
|---|---|---|---|---|---|---|---|---|---|---|---|
| Line No. | Z |   | 1 | 2 | 3 | 4 | 5 | 6 | 7 | 8 | 9... |

Referring to the transducer columns beginning with SP1, each successive group of five columns receives a transmission pulse with time delays as follows for generating the respective scanning lines:

| Delay for Line | | | | | | | |
|---|---|---|---|---|---|---|---|
| Z1 | $\tau_0$ | $\tau_1$ | $\tau_2$ | $\tau_1$ | $\tau_0$ | | |
| Z2 |  | $\tau_0$ | $\tau_1$ | $\tau_2$ | $\tau_1$ | $\tau_0$ | |
| Z3 |  |  | $\tau_0$ | $\tau_1$ | $\tau_2$ | $\tau_1$ | $\tau_0$ |
| Z4 |  |  |  |  |  |  |  |
| Z5 |  |  |  |  |  |  |  |
| Z6 |  |  |  |  |  |  |  |

Other suitable basic controls, in particular, also such with variable aperture, can, of course, likewise be employed as needed according to any desired selection.

The transmitting and receiving-switches illustrated in the basic circuit diagram of FIG. 3 can be the conventional controllable transistor switches. Precisely in the transmitting mode, in which, in adaptation to varying depths of focus, operation is carried out, e.g. with varying intensity of the transmitting signals, a design of the transmitting switch according to FIG. 4 is, however, advisable. In the case of FIG. 4, with low signal intensity, merely the center transducer element of the currently activated column SPi is switched to transmission. Upon switching over to higher intensity, in dependence upon the polarity of the transmitting signals, the diodes 35 or 36 become conductive, so that marginal (or border) elements of the column SPi are additionally switched on, for joint energization with the center transducer element. The described switch of FIG. 4 thus guarantees an automatic adaptation of the active transmitting surface to the selected intensity value in the case of switching energy outlay which is low and low in clicks.

It will be apparent that many modifications and variations may be effected without departing from the scope of the novel concepts and teachings of the present invention.

SUPPLEMENTARY DISCUSSION

In the embodiment of FIG. 3, each matrix bar such as 5-1 corresponds with one of five correspondingly designated matrix bars in FIG. 2. For the embodiment of FIG. 3, therefore, the transmitting components 8, 14, 15 in FIG. 2 are replaced by components 18 through 31 of FIG. 3, and receiving components 6, 7 are replaced by components 32, 33, FIG. 3. Then in FIG. 3, each set of five switches 4 is connected with respective ones of the five matrix bars 5-1, 5-2, 5-3, (5-4), and 5-5 in FIG. 2 (the fourth matrix bar being designated in parentheses since it is not actually shown in FIG. 2). Thus the fifth, tenth, fifteenth and twentieth columns of transducer elements (SP5), (SP10), (SP15), SP20, FIG. 2, for example, would each be connected to matrix bar 5-5, FIGS. 2 and 3. For the case of eighty columns of transducer elements, column SPN (SP80) is also connected to matrix bar 5-5, FIGS. 2 and 3, for example.

In FIG. 3, the switches 21-23 for transmit operation may actually be controlled by logic such as illustrated in the second figure of my U.S. Pat. No. 4,218,768 issued Aug. 19, 1980, so that the switches 21-23 are actually all open during receive mode. Thus AND gates such as twenty-two of said second figure may be enabled by respective inputs representing the condition of circulating shift registers 18, 19, 20, FIG. 3, but each gate having a further input which is only in a logical ONE condition during the transmit mode. Such AND gates can close switches 21-23 only at the transmit intervals in the vicinity of t0 to t0 plus $\tau_2$ (max), t1 to t1 plus $\tau_2$ (max), and t3 to t3 plus $\tau_2$ (max). Such transmit gating signals can be generated by triggering a monostable with delay $\tau_2$ (max) at times t0, t1 and t3 as is apparent to those skilled in the art.

The receiving operation herein for each depth region may utilize receiving circuits as shown in said second figure of my U.S. Pat. No. 4,218,768 and the disclosure of said U.S. patent is incorporated herein by reference as showing different transmitting and receiving mode circuitry which may be adapted to scanning of each of the depth regions as taught herein.

My copending application U.S. Ser. No. 830,173 filed Aug. 31, 1977 entitled "Apparatus for Ultrasonic Scanning" (now U.S. Pat. No. 4,235,111 issued Nov. 25, 1980) is also incorporated herein by reference for the purposes explained in the preceding paragraph and by way of background.

The following Tables summarize exemplary modes of operation of the embodiment of FIG. 3, such embodiment being incorporated into FIG. 2 and being implemented with AND gates and the like as described in this Supplementary Discussion.

TABLE I

Transmitting-Receiving Operation According to FIGS. 1 and 3

(Reference numerals not actually present in FIG. 1 or FIG. 3 are shown in parentheses)

Line Z1
(1) Initial Conditions.
  (a) SP1 through (SP5) connected to matrix bars 5-1, 5-2, 5-3, 5-4, 5-5, FIGS. 2 and 3 via the first five switches 4, FIG. 2. See U.S. Pat. No. 4,218,768, the second figure, for more precise details concerning switches 4.
  (b) receiving switches: 32, FIG. 3, open; 33, FIG. 3, closed.
  (c) delay switches 30 and 31, FIG. 3, in lowermost positions (maximum delay positions).
(2) Transmit Switch Sequence (FIG. 3) for Each Transmit Pulse S1, S2, S3, FIG. 1.
  (a) 23-1, 23-5, FIG. 3, closed to transmit a pulse from source 16, FIG. 3, at $\tau_0$ via SP1, (SP5), FIG. 2. (e.g. pulse S1, FIG. 1, at time t0).
  (b) (22-2) (22-4), FIG. 3, closed to transmit the same pulse with delay $\tau_1$ (max) via SP2, (SP4), FIG. 2 (e.g. pulse S1, FIG. 1, at time t0 plus $\tau_1$ (max).
  (c) 21-3, FIG. 3, closed to transmit the same pulse with delay $\tau_2$ (max) via SP3, FIG. 1 (e.g. pulse S1, FIG. 1, at time t0 plus $\tau_2$ (max)).
(3) Switch Sequence (FIG. 3) for the Successive Transmit Pulses S1, S2, S3, FIG. 3.
  (a) After pulse S1, items (2)(a), (b), (c) of this Table I, receive switches 32, FIG. 3, are closed and switches 33, FIG. 3, are opened to receive echo sequence E1, FIG. 1. Switches 21-23 are open. See the second figure of U.S. Pat. No. 4,218,768 concerning detail for switches 4.
  (b) Delay switches 30 and 31 to mid positions, amplification of amplifiers 26, 27, 28 increased, and pulse S2, FIG. 1, transmitted according to items (2)(a), (b), (c) of this Table I.
  (c) At time t2, FIG. 1, receive mode for echo sequence E2—same as item (a) of this section (3).
  (d) Delay switches 30 and 31 to upper minimum delay positions actually shown in FIG. 3, amplification of amplifiers 26, 27, 28 further increased, and pulse S3, FIG. 1, transmitted according to items (2)(a), (b), (c) of this Table I.
  (e) At time t4, FIG. 1, receive mode for echo sequence E3—same as item (3)(a).

Line Z2 (operation same as for line Z1 except as indicated)
(1)
  (a) SP2 through SP6 connected to matrix bars 5-2, 5-3, 5-4, 5-5 and 5-1, FIGS. 2 and 3, by the corresponding switches of the first bank of twenty switches 4 because of the shifting of five ONE-bits to positions no. two through no. six of shift register 9. See the second figure of said U.S. Pat. No. 4,218,768 for more specific detail concerning switches 4 and the control thereof.

(2)
(a) (23-2) and 23-1, FIG. 3, closed to transmit a pulse from source 16, FIG. 3, via SP2 and (SP6), FIG. 2.
(b) (22-3) and 22-5 closed to transmit the same pulse with delay $\tau_1$ (max) via SP3, (SP5).
(c) 21-4 closed to transmit the same pulse with delay $\tau_2$ (max) via (SP4).

Line Z3
(1)
(a) SP3 through (SP7) connected to matrix bars 5-3, (5-4), 5-5, 5-1, 5-2, FIGS. 2 and 3.
(2)
(a) (23-3) and (23-2) closed to transmit a pulse via SP3 and (SP7).
(b) (22-4) and 22-1 closed to transmit the same pulse via (SP4) and SP1.
(c) 21-5 closed to transmit the same pulse via (SP5).

Line Z4
(1)
(a) (SP4) through (SP8) connected to matrix bars (5-4), 5-5, 5-1, 5-2, 5-3, FIGS. 2 and 3.
(2)
(a) (23-4) and (23-3) closed to transmit a pulse via (SP4) and (SP8).
(b) 22-5 and (22-2) closed to transmit the same pulse via (SP5) and (SP7).
(c) 21-1 closed to transmit the same pulse via (SP6).

Line Z5
(1)
(a) (SP5) through (SP9) connected to matrix bars 5-5, 5-1, 5-2, 5-3, 5-4, FIGS. 2 and 3.
(2)
(a) 23-5 and (23-4) closed to transmit a pulse via (SP5) and (SP9).
(b) 22-1 and (22-3) closed to transmit the pulse via (SP6) and (SP8).
(c) 21-2 closed to transmit the pulse via (SP7).

Scanning Sequence: Line Z1, then line Z2, then line Z3, then line Z4, then line Z5, and so on through line Z76, and with such scanning repeated at 25 cycles per second, for example, each line requiring an elapsed time t0 through t5, FIG. 1, of about 500 microseconds. The amplitude of the pulses S1 may be sufficiently low in relation to pulses S2, that the echoes from region T2-T3 due to pulse S1 can be eliminated in the receiving circuitry by threshold discrimination. The oscilloscope display is of course blanked or reception is otherwise made zero during the time intervals t1 to t2 and t3 to t4.

TABLE II

Transmitting-Receiving Operation For Interlaced Scanning (Operation same as for Table I except as indicated below)

Scanning Sequence: Odd scan lines, i.e. line Z1, then line Z3, then line Z5, etc., through line Z75, so as to scan at the depths to T1, T2, T3 in succession with the successive depth scans being centered at SP3, (SP5), (SP7), etc., through (SP77) in sequence; followed by even scan lines, i.e. line Z2, then line Z4, then line Z6, etc., through line Z76, so as to scan at the depths to T1, T2, T3 in succession with beams centered at (SP4), then (SP6), then (SP8), etc., through (SP78) in sequence; followed by odd scan lines, and so on, so that odd and even fields alternate at a field rate of fifty fields per second, for example. (In this mode of operation ONE-bits in recirculating shift registers 18, 19, 20, are double shifted after each series of depth scans, and the five ONE-bit group in shift register 9 is also double shifted, being reset to initial positions no. 1-5 for odd line scans and to initial positions no. 2-6 for even line scans.)

TABLE III

Transmitting-Receiving Operation With Spatially Offset Simultaneous Scanning (Operation same as for Table I except as indicated below)

Scanning Sequence: At time t0, FIG. 1, pulse S1 from source 16 is supplied via two sets of switches 21-23 (both controlled by registers 18, 19, 20 via AND gates as described herein) to produced focussed beams scanning depth region T0-T1, FIG. 1, along beam paths centered at SP3 and at (SP43) simultaneously. Similarly at times t1 and t3. Then repeating the above for beam paths centered at (SP4) and (SP44), and so on. The two simultaneous lines may be recorded simultaneously by a dual beam oscilloscope so that a scan of eighty lines takes place fifty times per second.

I claim as my invention:
1. Apparatus for ultrasonic scanning, comprising
   (a) an ultrasonic scanning head for emitting a plurality of ultrasonic transmission pulses (S1, S2, S3) in a transmission mode for each scanning line and for receiving ultrasonic echos in a receiving mode, said ultrasonic transmission pulses producing respective ultrasound fields in a body to be scanned during said transmission mode, and said scanning head producing echo signals (E1, E2, E3) in response to the ultrasonic echos received from said body as a result of said ultrasonic transmission pulses;
   (b) receiving means for receiving echo signals (E1, E2, E3) corresponding to a given depth extent within the body in the direction of each respective scanning line with said given depth extent corresponding to the depth extent of an echo image to be produced;
   (c) dynamic focusing means connected to said scanning head for electrically effecting dynamic focusing of the ultrasound field emitted during said transmission mode, whereby said given depth extent is divided into a predetermined number of different depth regions (T0 to T1, T1 to T2, T2 to T3) comprising a first depth region and a second depth region, with an individual different fixed focusing setting being associated with each of said depth regions;
   (d) means connected to said scanning head
   (d1) for successively effecting transmitting/receiving cycles (S1-E1, S2-E2, S3-E3) for said different depth regions making up said given depth extent and with the respective individual different fixed focusing settings being effected in said transmission mode, and
   (d2) for controlling the start time (t0, t1, t3) of each transmitting/receiving cycle in such a manner that
      (d21) a first ultrasonic transmission pulse (e.g. S2) is emitted at a first point of time (e.g. t1) for scanning said first depth region (e.g. T1 to T2), whereby complete echo information from said first depth region is received within a first time interval (e.g. t2 to t3) having a first termination point, with additional echo information from the second depth region being received in a subsequent time interval subsequent to said first termination point, and whereby the time period in which echo information is received from the given depth extent to be scanned defines a round trip time; and (d22) a second ultrasonic pulse (e.g. S3) is emitted at a second point of time (e.g. t3) after echo information due to the first pulse (S2) has impinged on the scanning head from the first depth region (T1 to T2) but before a further termination point of impingement on the head of the echo information from the second depth region (T2 to T3) due to the first pulse (S2).

2. The apparatus according to claim 1, further comprising means for effecting receiving focusing during reception of echo signals from each of said respective depth regions (T0 to T1, T1 to T2, T2 to T3).

3. The apparatus according to claim 1, wherein said second transmission pulse (e.g. S3) is associated with an increased depth in comparison to said first transmission pulse (e.g. S2), and wherein the intensity of said second transmission pulse has a higher value than the intensity of said first transmission pulse.

4. The apparatus according to claim 3, further comprising a diode circuit (35, 36) for automatically adapting an active transmitting surface of said head to the selected intensity value of said transmission pulses.

5. The apparatus according to claim 1, wherein said focusing means comprises transmission delay means.

6. The apparatus according to claim 1, wherein said scanning head comprises a transmitting surface for emitting said ultrasound field, and wherein said focusing means comprises means for effecting adjustments of said transmitting surface, whereby greater surface areas are provided for respective increased depths of said respective depth regions.

7. The apparatus according to claim 1, wherein said scanning head comprises an ultrasonic array.

8. The apparatus according to claim 1, wherein said second point of time (t3) where said second transmission pulse (e.g. S3) is emitted is substantially said first termination point where said first time interval (e.g. t2 to t3) is finished.

9. The apparatus according to claim 1 wherein echo information from the second depth region is received from said second ultrasonic while echo information from the first ultrasonic pulse is impinging on the receiver reflected from a depth region within the given depth extent of the body.

* * * * *